United States Patent [19]

Coogan et al.

[11] Patent Number: 4,927,876

[45] Date of Patent: May 22, 1990

[54] AQUEOUS DISPERSIONS

[75] Inventors: Richard G. Coogan, North Reading; Razmik Vartan-Boghossian, Belmont, both of Mass.

[73] Assignee: ICI Americas Inc., Wilmington, Del.

[21] Appl. No.: 244,385

[22] Filed: Sep. 14, 1988

[30] Foreign Application Priority Data

Sep. 14, 1987 [GB] United Kingdom ............... 8721536

[51] Int. Cl.$^5$ .................... C08L 75/04; C08L 33/06
[52] U.S. Cl. ................... 524/457; 524/501; 524/507
[58] Field of Search ............ 524/457, 507, 840

[56] References Cited

U.S. PATENT DOCUMENTS 3,862,074  1/1975  Hickey .
4,198,330  8/1980  Kaizerman .................... 524/500
4,318,833  3/1982  Guagliardo .

FOREIGN PATENT DOCUMENTS 0057862  8/1982  European Pat. Off. .
0189945  8/1986  European Pat. Off. .
0220000  4/1987  European Pat. Off. .
2124239  2/1984  United Kingdom .

Primary Examiner—C. Warren Ivy
Attorney, Agent, or Firm—Cushman, Darby & Cushman

[57] ABSTRACT

An aqueous polymer dispersion containing a water-dispersible polyurethane and a vinyl polymer, the polyurethane being the product of reacting an active hydrogen containing chain extender with a water-dispersible isocyanate-terminated polyurethane prepolymer derived from a polyisocyanate component containing at least 5% by weight of 2,4'-diphenylmethane diisocyanate. The dispersions are useful as coating compositions.

16 Claims, No Drawings

AQUEOUS DISPERSIONS

This invention relates to aqueous dispersions and more particularly to aqueous polymer dispersions containing a water-dispersible polyurethane and a vinyl polymer.

Aqueous polyurethane dispersions are well known and are used in the production of, for example, coatings and films. Aqueous dispersions are also known which contain a dispersed vinyl polymer in addition to a polyurethane.

Thus, U.S. Pat. No. 3,862,074 describes coating or binding compositions which are aqueous emulsions or dispersions of one or more acrylic polymers and one or more urethane polymers, the product being prepared by simply blending a nonionic urethane dispersion and an acrylic dispersion. The only polyurethane described is a reaction product of a diamine and an isocyanate-terminated prepolymer derived from a polyether polyol and toluene diisocyanate.

Several patents describe processes wherein the vinyl monomer is polymerised in the presence of the aqueous polyurethane dispersion. In U.S. Pat. No. 3,705,164, the only polyisocyanates mentioned for the production of the polyurethane are hexamethylene diisocyanate and toluene diisocyanate. U.S. Pat. No. 4,198,330 mentions aromatic, aliphatic and cycloaliphatic diisocyanates but expresses a preference for toluene diisocyanate. In U.S. Pat. No. 4,318,833, the preferred diisocyanates are of the aliphatic type but some aromatic diisocyanates including toluene and 4,4'-diphenylmethane diisocyanates are mentioned. In EP-A-No. 189945, the preferred polyisocyanate seems to be dicyclohexylmethane diisocyanate.

It has now been found that aqueous dispersions containing a vinyl polymer and a polyurethane derived, at least in part, from 2,4'-diphenylmethane diisocyanate possess significant advantages over corresponding dispersions described in the prior art. Thus, coatings are obtained which are harder than those obtained from the corresponding TDI based products and have superior resistance towards water and a wide range of organic solvents.

Accordingly, the invention provides an aqueous polymer dispersion containing a water-dispersible polyurethane and a vinyl polymer, the polyurethane being the product of reacting an active hydrogen containing chain extender with a water-dispersible isocyanate-terminated polyurethane prepolymer derived from a polyisocyanate component containing at least 5% by weight of 2,4'-diphenylmethane diisocyanate.

The isocyanate-terminated prepolymer may owe its water-dispersibility to the use of external dispersing or emulsifying agents, for example surface active agents of a cationic, anionic or nonionic type but it is preferred that the prepolymer is dispersible because of the presence therein of appropriate ionic or nonionic groups.

Water-dispersible isocyanate-terminated prepolymers containing ionic centres may be the reaction products of:

(i) a polyisocyanate component containing at least 5% by weight of 2,4'-diphenylmethane diisocyanate, and (ii) an active hydrogen component comprising at least one polymeric polyol having a molecular weight in the range 400 to 6000 and optionally one or more low molecular weight polyol or polyamine having a molecular weight below 400, at least one of the polyols or polyamine containing ionic or potentially ionic groups.

The ionic groups may be cationic, for example

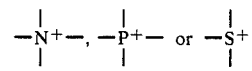

or anionic, for example $-SO_3^-$, $-OSO_3^-$, $-PO_2^-$, $-PO_3^-$, $OPO_3^-$, or, preferably $-COO^-$.

The term "potentially ionic" refers to groups such as free carboxylic acid or tertiary amino groups which can be converted to ionic groups by neutralization or quaternisation.

In general, anionic groups are preferably incorporated in the prepolymer in the form of a low molecular weight polyol or polyamine whilst cationic groups may be conveniently incorporated by means of either a polymeric polyol or a low molecular weight polyol or polyamine.

The polyisocyanate component used in the preparation of the prepolymer can be mixture of 2,4'-diphenylmethane diisocyanate with at least one other organic polyisocyanate, such mixtures containing at least 5%, preferably at least 10% by weight of the 2,4'-diphenylmethane diisocyanate.

Thus, the polyisocyanate component may be a mixture of the 2,4'- and the 4,4'-isomers of diphenylmethane diisocyanate, possibly with small amounts of the 2,2'-isomer. Such mixtures can contain from 5 to 70% by weight of the 2,4'-isomer although mixtures containing more than 70% by weight can also be used.

Other polyisocyanate components which may be used include carbodiimide/uretonimine modified diphenylmethane diisocyanates which may be obtained in known manner by treating a mixture of the 4,4'- and 2,4'-isomers with a catalyst for the conversion of isocyanate groups to carbodiimide groups. Suitable catalysts, which include trialkyl phosphates, phosphoramides, phospholenes and phospholidines, have been described in United Kingdom Patent Specification No. 1476088.

Further polyisocyanate components which may be used in the preparation of the prepolymer include mixtures of any of the above-mentioned diphenylmethane diisocyanate compositions with other organic polyisocyanates, especially the commercially available polyisocyanates such as toluene diisocyanate, isophorone diisocyanate, hexamethylene diisocyanate and dicyclohexylmethane diisocyanate. Such mixtures should contain at least 5% by weight of the 2,4'- diphenylmethane diisocyanate. Useful mixtures contain toluene diisocyanate, especially an 80/20 mixture of the 2,4- and 2,6-isomers, and one of the above-mentioned diphenylmethane diisocyanate compositions, especially a mixture of the 2,4'- and 4,4'-isomers. Thus, a useful polyisocyanate component comprises:

(i) from 10 to 60% by weight of toluene diisocyanate, and (ii) from 90 to 40% by weight of a mixture of 4,4'-and 2,4'-diphenylmethane diisocyanates containing from 5 to 70% by weight of the 2,4'-isomer.

Particular mention may be made of mixtures comprising from 30 to 50% by weight of toluene diisocyanate and from 70 to 50% by weight of a 4,4'-/2,4'-diphenylmethane diisocyanate mixture containing from 10 to 40%, especially 20 to 30% by weight of the 2,4'-isomer.

Polymeric polyols having molecular weights in the range 400–6000 which may be used in the preparation of the prepolymer particularly include diols and triols and mixtures thereof but higher functionality polyols may be used, for example as minor components in admixture with diols. The polyols may be members of any of the chemical classes of polymeric polyols used or proposed to be used in polyurethane formulations. In particular, the polyols may be polyesters, polyesteramides, polyethers, polythioethers, polycarbonates, polyacetals, polyolefins or polysiloxanes. Where appropriate, the polyols may contain free tertiary amino groups. Preferred polyol molecular weights are from 700 to 2000.

Polyester polyols which may be used include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol or mixtures thereof with polycarboxylic acids, especially dicarboxylic acids or their ester-forming derivatives, for example succinic, glutaric and adipic acids or their dimethyl esters, phthalic anhydride or dimethyl terephthalate. Polyesters obtained by the polymerization of lactones, for example caprolactone, in conjunction with a polyol may also be used. Polyesteramides may be obtained by the inclusion of amino-alcohols such as ethanolamine in polyesterification mixtures. Polyesters containing free tertiary amino groups may be obtained by including tertiary amino polyols, for example triethanolamine or N-methyldiethanolamine in the polyesterification reaction.

Polyether polyols which may be used include products obtained by the polymerization of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylolpropane, pentaerythritol or Bisphenol A. Especially useful polyethers include polyoxypropylene diols and triols, poly(oxyethylene-oxypropylene) diols and triols obtained by the simultaneous or sequential addition of ethylene and propylene oxides to appropriate initiators and polytetramethylene ether glycols obtained by the polymerization of tetrahydrofuran. Polyethers containing free tertiary amino groups may be obtained by the oxyalkylation, for example oxypropylation, of ammonia, primary or secondary amines and aminoalcohols. Examples of suitable amines include ethylene diamine, aniline benzylamine, toluene diamines, diaminodiphenylmethane and polymethylene polyphenyl polyamines. Suitable aminoalcohols include ethanolamine, diethanolamine, triethanolamine, N-methyldiethanolamine, bis(2-hydroxyethyl)aniline, bis(2-hydroxypropyl)aniline and bis(2-hydroxyethyl)benzylamine. In the oxyalkylation process, mixtures of amino-containing and amino-free initiators may be used if desired.

Polythioether polyols which may be used include products obtained by condensing thiodiglycol either alone or with other glycols, dicarboxylic acids, formaldehyde, aminoalcohols or aminocarboxylic acids.

Polycarbonate polyols which may be used include products obtained by reacting diols such as 1,3-propanediol, 1,4%-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol and hexanediol with formaldehyde. Suitable polyacetals may also be prepared by polymerising cyclic acetals.

Suitable polyolefin polyols include hydroxy-terminated butadiene homo- and copolymers.

Organic polyols having molecular weights below 400 which may optionally be used in the preparation of the prepolymer particularly include diols and triols and mixtures thereof but higher functionality polyols may be used. Examples of such lower molecular weight polyols include ethylene glycol, diethylene glycol, tetraethylene glycol, bis(hydroxyethyl) terephthalate, cyclohexane dimethanol, furan dimethanol, glycerol and the reaction products, up to molecular weight 399 of such polyols with propylene oxide and/or ethylene oxide.

Tertiary amino group containing polyols such as triethanolamine, tetrakis(hydroxypropyl) ethylene diamine or the lower molecular weight oxyalkylation products of ammonia, amines and amino-alcohols may be used, for the purpose of introducing cationic groups into the prepolymer.

Low molecular weight polyols or polyamines which may be used to introduce anionic centres into the prepolymer include dihydroxyalkanoic acids, for example 2,2-dimethylolpropionic acid and aminocarboxylic acids, for example lysine, cystine and 3,5-diaminobenzoic acid.

Water-dispersible isocyanate-terminated prepolymers containing nonionic hydrophilic centres may be the reaction products of:

(i) a polyisocyanate component containing at least 5% by weight of 2,4'-diphenylmethane diisocyanate;

(ii) a polymeric polyol having a molecular weight in the range 400 to 6000;

(iii) a dispersing diol and/or diisocyanate having a pendent polyoxyethylene chain, and optionally (iv) an organic polyol having a molecular weight below 400.

Polyisocyanate components, polymeric polyols and low molecular weight polyols which may be used in preparing the nonionic prepolymers include those described above. If desired, the components may be so chosen that the prepolymers contain both nonionic and ionic or potentially ionic centres.

Diols having pendent polyoxyethylene chains which may be used in the preparation of the nonionic prepolymer include those described in the prior art, for example in U.S. Pat. No. 3,905,929. These diols, because of their function, may be regarded as dispersing diols. Particularly suitable dispersing diols may be obtained by reacting one mole of an organic diisocyanate in which the two isocyanate groups have different reactivities with approximately one mole of a polyethylene glycol monoether and then reacting the adduct so obtained with approximately one mole of a dialkanolamine, for example diethanolamine.

Diisocyanates having groups of different reactivity which may be used in the preparation of the dispersing diols include 2,4-toluene diisocyanate, isophorone diisocyanate and 2,4'-diphenylmethane diisocyanate. Polyethylene glycol monoethers which may be used include the reaction products of ethylene oxide with monohydric alcohols such as methanol, ethanol, tertiary butanol or benzyl alcohol or phenols such as phenol itself. The polyethylene glycol monoethers suitably have molecular weights in the range 250 to 3000 and preferably in the range 500 to 2000.

If desired, the polyoxyethylene chains may contain units of other alkylene oxides in addition to the ethylene oxide units. Thus, polyoxyalkylene chains in which up to 60% of the alkylene oxide units are propylene oxide units, the remainder being ethylene oxide units, may be used.

The preparation of the dispersing diols may be achieved by adding the polyethylene glycol monoether to the diisocyanate at 20°-50° C., optionally in the presence of an inert solvent and a urethane catalyst, followed by addition of the dialkanolamine.

Diisocyanates having pendent polyoxyethylene chains which may be used in the preparation of the nonionic prepolymer include those described in the prior art, for example in U.S. Pat. No. 3,920,598. These diisocyanates, because of their function, may be regarded as dispersing diisocyanates. Particularly suitable dispersing diisocyanates may be obtained by reacting two moles of an organic diisocyanate in which the two isocyanate groups have different reactivities with approximately one mole of a polyethylene glycol monoether, the initially formed urethane monoisocyanate then reacting at a higher temperature with the excess diisocyanate to form an allophanate diisocyanate having a pendent polyoxyethylene chain.

Suitable diisocyanates and polyethylene glycol monoethers for use in preparing the dispersing diisocyanates have been mentioned above for the preparation of the dispersing diols.

Preferred prepolymers are those in which the active hydrogen component comprises:

(i) a polymeric diol having a molecular weight of from 400 to 6000, especially from 400 to 1500, (ii) from 1 to 2 moles, per mole of polymeric diol, of a carboxy group containing diol or triol, and (iii) from 0 to 1.2 mole, per mole of polymeric diol, of a diol having a molecular weight from 62 to 300.

Particularly preferred active hydrogen components include those in which the polymeric diol is a polytetramethylene ether glycol, a carboxy-containing diol, for example dimethylolpropionic acid, is present in an amount of from 1.2 to 1.6 moles per mole of polymeric diol and the low molecular weight diol is cyclohexane dimethanol.

The prepolymers may be prepared in conventional manner by reacting a stoichiometric excess of the organic polyisocyanate component with the appropriate active hydrogen components under substantially anhydrous conditions at a temperature between about 30° C. and about 130° C. until reaction between the isocyanate groups and the active hydrogen groups is substantially complete. The polyisocyanate and the active hydrogen containing components are suitably reacted in such proportions that the ratio of number of isocyanate groups to the number of hydroxyl and amino groups is in the range from about 1.1:1 to about 6:1. preferably within the range of from 1.5:1 to 3:1.

If desired, catalysts such as dibutyltin dilaurate and stannous octoate may be used to assist prepolymer formation and a non-reactive solvent may be added before or after prepolymer formation to control the viscosity. Suitable solvents which may be used include acetone, methylethylketone, dimethylformamide, ethylene carbonate, propylene carbonate, diglyme, N-methylpyrrolidone, ethyl acetate, ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidone, dimethyl sulphoxide and dialkyl ethers of glycol acetates or mixtures of N-methylpyrrolidone and methyl ethyl ketone. Other suitable solvents include vinyl monomers which are subsequently polymerised.

Aqueous polyurethane dispersions may be prepared by dispersing the water dispersible, isocyanate-terminated polyurethane prepolymer in an aqueous medium and chain extending the prepolymer with an active hydrogen containing chain extender.

The prepolymer may be dispersed in water using techniques well known in the art. Preferably, the prepolymer is added to the water with agitation or, alternatively, water may be stirred into the prepolymer.

Conversion of any potentially ionic groups, for example carboxy groups, in the prepolymer to ionic (salt) groups may be effected before, simultaneously with or after the addition of the prepolymer to water. The agent used to effect neutralization of a carboxy group may suitably be a tertiary amine such as triethylamine, triethanolamine or N-methylmorpholine, an alkaline hydroxide such as sodium or potassium hydroxide or a quaternary ammonium hydroxde.

The active hydrogen containing chain extender which is reacted with the prepolymer is suitably a polyol, an amino alcohol, ammonia, a primary or secondary aliphatic, alicyclic, aromatic, araliphatic or heterocyclic amine especially a diamine, hydrazine or a substituted hydrazine. Water-soluble chain extenders are preferred, and water itself may be effective.

Examples of suitable chain extenders useful herein include ethylene diamine, diethylene triamine, triethylene tetramine, propylene diamine, butylene diamine. hexamethylene diamine, cyclohexylene diamine, piperazine, 2-methyl piperazine, phenylene diamine, tolylene diamine, xylylene diamine, tris(2-aminoethyl) amine, 3,3'-dinitrobenzidine, 4,4'-methylenebis (2-chloroaniline), 3,3'-dichloro-4,4'-bi-phenyl diamine, 2,6-diaminopyridine, 4,4'-diaminodiphenylmethane, menthane diamine, m-xylene diamine and isophorone diamine. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazine such as gamma-hydroxylbutyric hydrazide, bis-semi-carbazide, bis-hydrazide carbonic esters of glycols such as any of the glycols mentioned above.

Where the chain extender is other than water, for example a diamine or hydrazine, it may be added to the aqueous dispersion of prepolymer or, alternatively, it may already be present in the aqueous medium when the prepolymer is dispersed therein.

The chain extension can be conducted at elevated, reduced or ambient temperatures. Convenient temperatures are from about 5° to 95° C. or more, preferably from about 10° to about 45° C.

The amount of chain extender employed should be approximately equivalent to the free-NCO groups in the prepolymer, the ratio of active hydrogens in the chain extender to NCO groups in the prepolymer preferably being in the range from 1.0 to 2.0:1. Of course, when water is employed as the chain extender, these ratios will not be applicable since the water, functioning both as chain extender and dispersing medium, will be present in gross excess relative to the free-NCO groups.

The aqueous polymer dispersion of the invention may be prepared by simply blending an aqueous polyurethane dispersion prepared as described above, with an aqueous dispersion of a vinyl polymer. It is preferred, however to polymerise one or more vinyl monomers in the presence of the aqueous polyurethane dispersion. This may be effected by adding the vinyl monomer or monomers to the polyurethane dispersion, either gradually or all at once, and then subjecting the monomer to polymerization conditions. Alternatively, a solution of prepolymer in vinyl monomer may be dispersed in an aqueous medium after which the prepolymer is chain extended and the vinyl monomer polymerised.

Vinyl monomers which may be polymerised to form the vinyl polymer component of the aqueous dispersions of the invention include any radically polymerisable olefinically unsaturated compounds or mixtures thereof. Thus, there may be mentioned hydrocarbon monomers, for example butadiene, isoprene, styrene and divinyl benzene acrylic and methacrylic acids, acrylonitrile methyl, ethyl, 2-hydroxyethyl, butyl and isobutyl acrylates and methacrylates, acrylamide, methacrylamide, N-methylolacrylamide and other commonly used monomers such as vinyl esters, vinyl ethers, vinyl ketones and heterocyclic vinyl compounds.

Polymerization of the vinyl monomer or monomers may be effected using conventional emulsion polymerization techniques. Thus, the monomer may be contacted with free radical initiators, especially initiators partitioned between the aqueous and organic phases, for example a combination of t-butylhydroperoxide, isoascorbic acid and Fe.EDTA.

The weight ratio of polyurethane to vinyl polymer in the dispersions of the invention is suitably in the range from 9:1 to 1:9 with a solid content in the range from about 30% to about 45% by weight. Viscosities are usually between 20 and 1000 cps at 25° C. and the pH is commonly around 7.5 to 9.0.

The aqueous polymer dispersions of the invention are stable for long periods of time. They may advantageously be employed as coating compositions for which purpose they may be further diluted with water and/or organic solvents or they may be supplied in more concentrated form by evaporation of water and/or organic components of the liquid medium. As coating compositions, they may be applied to any substrate including wood, metals, glass, cloth, leather, paper, plastics, foam and the like by any conventional method including brushing, dipping, flow coating, spraying and the like. The compositions may contain other conventional ingredients including organic solvents, pigments, dyes, emulsifiers, surfactants, thickeners, heat stabilisers, levelling agents, anti-coating agents, fillers, sedimentation inhibitors, UV absorbers, antioxidants and the like introduced at any stage of the production process or subsequently. It is also possible to include an amount of an antimony oxide in the dispersions to enhance the fire retardant properties. The dispersions may also be used as adhesives for materials such as polypropylene, polyester, polyurethane, leather and the like or as binding agents for various particulate materials.

Compared to TDI based urethane-acrylics, the polymers derived from the dispersion of the invention are some 13 to 25% harder. In addition, the MDI based polymers have better solvent resistance towards methyl ethyl ketone, ethanol, N-methylpyrrolidinone and isopropanol. Most importantly, the MDI based urethane-acrylics have better water resistance properties compared to the TDI based products.

The invention is illustrated but not limited by the following Examples.

EXAMPLE 1

PREPARATION OF WATER REDUCIBLE POLYURETHANE

A 1000 ml 4-neck resin flask equipped with thermometer, overhead stirrer and nitrogen was charged with 143 g (0.286 eq.) of polytetramethylene ether glycol of molecular weight 1000, 20.4 g (0.286 eq.) cyclohexane dimethanol, 28.9 g (0.432 eq.) of dimethylolpropionic acid, 126 g of N-methylpyrrolidinone and 25 g of methyl ethyl ketone. The reactor was heated to 60° C. until all the dimethylol propionic acid dissolved and was then cooled to 20° C. To the reactor was added 164.2 g (1.55 eq.) of a mixture containing 96.4 g (0.775 eq.) of a 77:23 ratio of 4,4':2,4'-diphenylmethane diisocyanate and 67.4 g (0.775 eq.) of a 80:20 ratio of 2,6:2,4-toluene diisocyanate. The reaction was allowed to exotherm to 60°-70° C. while cooling over an ice bath. After the exotherm was completed, the reaction was warmed to 65° C. for two hours. The NCO % of the prepolymer is 4.1%.

A dispersion of the prepolymer was prepared by feeding 400 g at 40° C. into 498 g. of deionized water containing 17.9 g of triethylamine and 5.93 g of hydrazine. The dispersion temperature was controlled between 15°-25° C. and was allowed to stir one hour after the addition of prepolymer was complete. The dispersion has a pH of 8.0, viscosity of 85cps, and a solids content of 31%.

PREPARATION OF URETHANE-ACRYLIC DISPERSION

A 500 ml reactor under nitrogen was charged as follows: 210 g of the polyurethane dispersion, 69 g of distilled water, 0.16 g of triethylene tetramine. 0.64 g of a 1% solution of Fe.EDTA. 3.4 g of a 3.5% solution of t-butyl hydroperoxide and 13 g of a vinyl mixture containing styrene, butyl acrylate, methyl methacrylate and acrylonitrile having a 45:19:30:6 ratio. The reaction mixture was warmed to 35° C. and 4.1 g of a 1% solution of isoascorbic acid neutralized with triethyl amine was added. After the reaction exotherm was complete another 10.3 g of the 3.5% t-butyl hydroperoxide was added, followed by the slow feed addition of 52 g of more vinyl monomers. During the vinyl monomer addition, another 12.3 g of 1% isoascorbic acid triethyl amine was added in ten separate additions. Total time of addition was one hour. After the addition was complete, the temperature was raised to 55° C. for one hour. The final dispersion has a solid content of 35%, viscosity of 80 cps and a pH of 8.2.

7-Day Humid Age Test on B-1000 steel: No effect.
7-Day Water Immersion Test on B-1000 steel: No effect.

EXAMPLE 2

PREPARATION OF WATER REDUCIBLE POLYURETHANE

A polyurethane was prepared as described in Example 1, except that only TDI was used. The following amounts were used to prepare the urethane:

| | |
|---|---|
| Polytetramethylene glycol | 143 g |
| Dimethylolpropionic acid | 28.9 g |
| 1,4-cyclohexane dimethanol | 20.4 |
| Methyl ethyl ketone | 23 |
| M-pyrol | 115 |
| Toluene diisocyanate 80/20 | 131 |
| Hydrazine | 7.5 |
| Water | 575 |
| Triethyl amine | 22.8 |

PREPARATION OF URETHANE-ACRYLIC DISPERSION

A urethane-acrylic dispersion was prepared as described in Example 1 except that the TDI containing urethane was used.

7-Day Humid Test on B-1000 steel: Blisters, rust and peeling.

7-Day Water Immersion Test on B-1000 steel: rust and pitted.

EXAMPLES 3–5

PREPARATION OF WATER REDUCIBLE POLYURETHANES

Urethane polymers were prepared as in Example 1 except the following amounts were used:

| | Equivalents | EX. 3 | EX. 4 | EX. 5 |
|---|---|---|---|---|
| Polytetramethylene glycol | 0.45 | 225 | 225 | 225 |
| Dimethylolpropionic acid | 0.55 | 36.8 | 36.8 | 36.8 |
| M-Pyrol | | 160 | 160 | 140 |
| Methyl ethyl ketone | | 32 | 32 | 28 |
| MDI 4,4':2,4' 77:23 50:50 | 1.5 1.5 | 187.5 | 187.5 | |
| TDI | 1.5 | | | 130.5 |
| Hydrazine | 0.47 | 7.5 | 7.5 | 7.5 |
| Triethylamine | 0.289 | 29.2 | 29.2 | 29.2 |
| Water | | 844 | 844 | 735 |

PREPARATION OF URETHANE-ACRYLIC DISPERSIONS

Urethane-acrylic dispersions were prepared as in Example 1 from each of the 3 urethane polymers, using 216 g of polymer together with

| | |
|---|---|
| Water | 121 |
| Fe/EDTA 1% | 0.65 |
| Triethylene tetramine | 0.16 |
| Vinyl monomers | 13 |
| TBHPO 3.5% | 2.0 |
| Isoascorbic acid 1% | 2.4 |
| Vinyl monomers | 52 |
| TBHPO | 11.7 |
| Isoascorbic acid | 14.0 |

| | EX. 3 | EX. 4 | EX. 5 |
|---|---|---|---|
| Viscosity, cps | 800 | 45 | 57 |
| Solids % | 30 | 30 | 30 |
| pH | 9 | 8.5 | 9 |
| Humid Age 100° F. 95% R.H | | | |
| 1 day | No effect | No effect | Blistering |
| 7 day | Slight Whitening | Slight Whitening | Blister-rust through |

The TDI based polymer of Example 5 is clearly inferior to the MDI based polymers of Examples 3 and 4 in humidity resistance.

EXAMPLE 6

A simple urethane-acrylic blend is prepared by mixing the polyurethane from Example I with an acrylic polymer prepared from styrene, butyl acrylate, methyl methacrylate and acrylonitrile in a monomer ratio of 45:19:30:6. The blended dispersion had a solids content of 35%, pH of 8.0 and viscosity of 80 cps.

7-Day Humid Age on B-1000 steel: Whitening, rusted blisters.

7-Day Water Immersion Test on B-1000 steel: whitening, rusted, blisters.

The properties of coatings prepared from the dispersions of the foregoing Examples are displayed in Table 1.

TABLE 1
COMPARISON OF MDI VS TDI URETHANE-ACRYLICS

| | A | B | C | D | E |
|---|---|---|---|---|---|
| Isocyanate | | | | | |
| MDI % | 22 | | 13.3 | | 13.3 |
| TDI % | | 16.1 | 9.3 | 19.8 | 9.3 |
| Acrylic Portion % | 50 | 50 | 50 | 50 | 50 |
| Sward Hardness | 40 | 32 | 50 | 44 | 52 |
| Chemical Resistance | | | | | |
| Toluene | 10 | 8 | 10 | 10 | 9 |
| 1,1,1-TCE | 10 | 8 | 10 | 10 | 10 |
| N-methyl pyrrolidinone | 3 | 0 | 5 | 0 | 4 |
| Dipropylene glycol methyl ether acetate | 7 | 5 | 9 | 7 | 7 |
| Methyl ethyl ketone | 6 | 4 | 6 | 0 | 4 |
| Isopropanol | 10 | 9 | 10 | 8 | 10 |
| Ethanol | 9 | 7 | 9 | 5 | 8 |
| Ethanol-$H_2O$ 1:1 | 10 | 7 | 10 | 9 | 9 |
| 2.8% Ammonia | N.E. | B,P | N.E. | B,P | N.E. |
| KOH 0.5 N | N.E. | B,P | N.E. | B,P | N.E. |
| HCl 1.0 N | N.E. | N.E. | N.E. | N.E. | N.E. |

TABLE 1-continued

| COMPARISON OF MDI VS TDI URETHANE-ACRYLICS | | | | | |
|---|---|---|---|---|---|
| | A | B | C | D | E |
| Humid Age - 100 F, 95% R.H. | | | | | |
| 1 day | N.E. | B,P | N.E. | Sl. W. | N.E. |
| 7 day | Sl. W. | B,P,R | N.E. | B,P,R | N.E. |
| H₂O Immersion | | | | | |
| 7 day | N.E. | B,P,R | N.E. | B,P,R | Sl. W |
| MEK double rubs until failure | 43 | 12 | 92 | 22 | |

A from Ex 3; B from Ex 5; C from Ex 1; D from Ex 2; E from Ex 6.
N.E. = No effect
B = Blisters
P = Peeled
R = Rust
Sl. W. = Slightly whiten
0-10 = 0-Worse 10-Best

EXAMPLE 7 (Comparative Example)

A polyurethane was prepared as described in Example 1, except that isophorone diisocyanate was used in place of 2,4':4,4,'-MDI. The following amounts were used to prepare the urethane:

| Polytetramethylene glycol (mw = 1000) | 143 |
|---|---|
| Dimethylolpropionic acid | 28.9 |
| 1,4-Cyclohexane dimethanol | 20.4 |
| Methyl ethyl Ketone | 25.4 |
| N-methyl pyrrolidone | 127.4 |
| Toluene diisocyanate 80/20 | 67.4 |
| Isophorone diisocyanate | 97.0 |
| N₂H₄ | 9.8 |
| H₂O | 575 |
| Triethylamine | 22.8 |

The obtained dispersion has a pH of 8.47 and a viscosity of 2650 cps at 31% solids.

PREPARATION OF URETHANE-ACRYLIC DISPERSIONS

A urethane-acrylic dispersion was prepared as described in Example 1 except that the TDI-IPDI containing urethane was used.

7-day Humid Age Test on B-1000 steel: blisters, rust whitening and peeling.

7-day Water Immersion Test on B-1000 steel: rust, blisters and pitted.

EXAMPLE 8 (Comparative Example)

A polyurethane was prepared as described in Example 1, except that methane dicyclohexyl diisocyanate was used in place of 2,4:4,4'-MDI. The following amounts were used to prepare the urethane:

| Polytetramethylene glycol (mw = 1000) | 143 |
|---|---|
| Dimethylolpropionic acid | 28.9 |
| 1,4-Cyclohexane dimethanol | 20.4 |
| Methyl ethyl Ketone | 25.4 |
| N-Methyl pyrrolidone | 127.4 |
| Toluene diisocyanate 80/20 | 67.4 |
| Methane dicyclohexyldiisocyanate | 97 |
| N₂H₄ | 7.8 |
| H₂O | 575 |
| Triethylamine | 22.8 |

The obtained dispersion has a pH of 7.9, a viscosity of 90 cps and a solids content of 31%.

PREPARATION OF URETHANE-ACRYLIC DISPERSION

A urethane-acrylic dispersion was prepared as described in Example 1 except that the TDI-methane dicyclohexane diisocyanate was used.

7-day Humid Age Test on B-1000 steel: blisters, whitening, rust and peeling.

7-day Water Immersion Test on B-1000 steel: blisters, rust and peeling.

We claim:

1. An aqueous polymer dispersion containing a water-dispersible polyurethane and a vinyl polymer, the polyurethane being the product of reacting an active hydrogen containing chain extender with a water-dispersible isocyanate-terminated polyurethane derived from a polyisocyanate component comprising a mixture of the 2,4'- and 4,4'-isomers of diphenylmethane diisocyanate containing from 5 to 70% by weight of the 2,4'-isomer.

2. A dispersion according to claim I wherein the prepolymer is the reaction product of:
   (i) a polyisocyanate component comprising a mixture of the 2,4'- and 4,4'-isomers of diphenylmethane diisocyanate containing from 5 to 70% by weight of the 2,4'-isomer, and
   (ii) an active hydrogen component comprising at least one polymeric polyol having a molecular weight in the range 400 to 6000 and optionally one or more low molecular weight polyols and polyamines having a molecular weight below 400, at least one of the polyols or polyamines containing ionic or potentially ionic groups.

3. A dispersion according to claim 2 wherein the active hydrogen component comprises:
   (i) a polymeric diol having a molecular weight of from 400 to 6000,
   (ii) from 1 to 2 moles, per mole of polymeric diol, of a carboxy group containing diol or triol, and
   (iii) from 0 to 1.2 mole, per mole of polymeric diol of a diol having a molecular weight from 62 to 300.

4. A dispersion according to claim 3 wherein the polymeric diol is a polytetramethylene ether glycol.

5. A dispersion according to claim 3 wherein the carboxy group containing diol is 2,2-dimethylolpropionic acid.

6. A dispersion according to claim 3 wherein the diol having a molecular weight from 62 to 300 is cyclohexane dimethanol.

7. An aqueous polymer dispersion containing a water-dispersible polyurethane and a vinyl polymer, the polyurethane being the product of reacting an active hydrogen containing chain extender with a water-dispersible isocyanate-terminated polyurethane prepolymer derived from a polyisocyanate component comprising:
- (i) from 10 to 60% by weight of toluene diisocyanate, and
- (ii) from 90 to 40% by weight of a mixture of 4,4'- and 2,4-diphenylmethane diisocyanates containing from 5 to 70% by weight of the 2,4'-isomer.

8. A dispersion according to claim 7 wherein the polyisocyanate component comprises from 30 to 50% by weight of toluene diisocyanate and from 70 to 50% by weight of 4,4'/2,4'-diphenylmethane diisocyanate mixture containing from 10 to 40% by weight of the 2,4'-isomer.

9. A dispersion according to claim 8 wherein the 4,4'/2,4'-diphenylmethane diisocyanate mixture contains from 20 to 30% by weight of the 2,4'-isomer.

10. A dispersion according to claim 7 wherein the prepolymer is the reaction product of:
- (i) a polyisocyanate component comprising from 10 to 60% by weight of toluene diisocyanate and from 90 to 40% by weight of a mixture of 4,4'- and 2,4'-diphenylmethane diisocyanates containing from 5 to 70% by weight of the 2,4'-isomer, and
- (ii) an active hydrogen component comprising at least one polymeric polyol having a molecular weight in the range 400 to 6000 and optionally one or more low molecular weight polyols and polyamines having a molecular weight below 400, at least one of the polyols or polyamines containing ionic or potentially ionic groups.

11. A dispersion according to claim 10 wherein the active hydrogen component comprises:
- (i) a polymeric diol having a molecular weight of from 400 to 6000,
- (ii) from 1 to 2 moles, per mole of polymeric diol, of a carboxy group containing diol or triol, and
- (iii) from 0 to 1.2 mole, per mole of polymeric diol of a diol having a molecular weight from 62 to 300.

12. A dispersion according to claim 10 wherein the polymeric diol is a polytetramethylene ether glycol.

13. A dispersion according to claim 10 wherein the carboxy group containing diol is 2,2-dimethylolpropionic acid.

14. A dispersion according to claim 10 wherein the diol having a molecular weight from 62 to 300 is cyclohexane dimethanol.

15. A dispersion according to claim 1 or claim 7 prepared by the free radical polymerisation of one or more vinyl monomers in the presence of an aqueous dispersion of the water-dispersible polyurethane.

16. A coating of film derived from an aqueous dispersion as claimed in claim 1 or claim 7.

* * * * *